United States Patent
Sterken et al.

(10) Patent No.: US 6,299,405 B1
(45) Date of Patent: *Oct. 9, 2001

(54) MATERIAL HANDLING DEVICE

(75) Inventors: Tim R. Sterken, Grand Rapids; Philip L. Berridge, Allendale, both of MI (US)

(73) Assignee: Herman Miller, Inc.

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/317,683

(22) Filed: May 24, 1999

Related U.S. Application Data

(60) Provisional application No. 60/087,851, filed on Jun. 3, 1998.

(51) Int. Cl.⁷ ........................................................ B25J 3/04
(52) U.S. Cl. .................. 414/758; 414/762; 414/773; 198/403; 198/404
(58) Field of Search ................................. 198/404, 403; 414/758, 761, 762, 763, 765, 768, 773

(56) References Cited

U.S. PATENT DOCUMENTS

| | | | |
|---|---|---|---|
| 2,386,925 | * 10/1945 | Beck et al. | 414/758 |
| 4,160,507 | * 7/1979 | Mullins | 414/749 |
| 4,760,671 | * 8/1988 | Ward | 51/215 |
| 5,115,904 | * 5/1992 | Folk et al. | 198/403 |
| 5,125,495 | * 6/1992 | Ganzberger et al. | 198/345.1 |

FOREIGN PATENT DOCUMENTS

| | | | |
|---|---|---|---|
| 1279633 | * 10/1968 | (DE) | 414/758 |
| 2628504 | * 6/1976 | (DE) | 189/403 |

* cited by examiner

*Primary Examiner*—Joseph A. Fischetti
(74) *Attorney, Agent, or Firm*—Brinks, Hofer, Gilson & Lione

(57) ABSTRACT

A material handling system, apparatus, and method for transferring and inverting a generally planar panel is disclosed. The system, apparatus, and method is comprised of a panel-engaging member and a panel-engaging member rotator. The panel-engaging member has a generally rectangular slot to receive only a portion of a panel. The panel-engaging member rotator is adapted to rotate the panel-engaging member about an axis generally parallel to the width of the slot between a position where the slot is generally horizontal and facing one direction to another position where the slot is generally horizontal and facing a generally opposite direction. The height, depth, and width of the slot are selected so that when a portion of the panel is inserted into the slot, the portion of the panel is kept from falling out of the slot by gravity and friction when the holding member is moved.

22 Claims, 8 Drawing Sheets

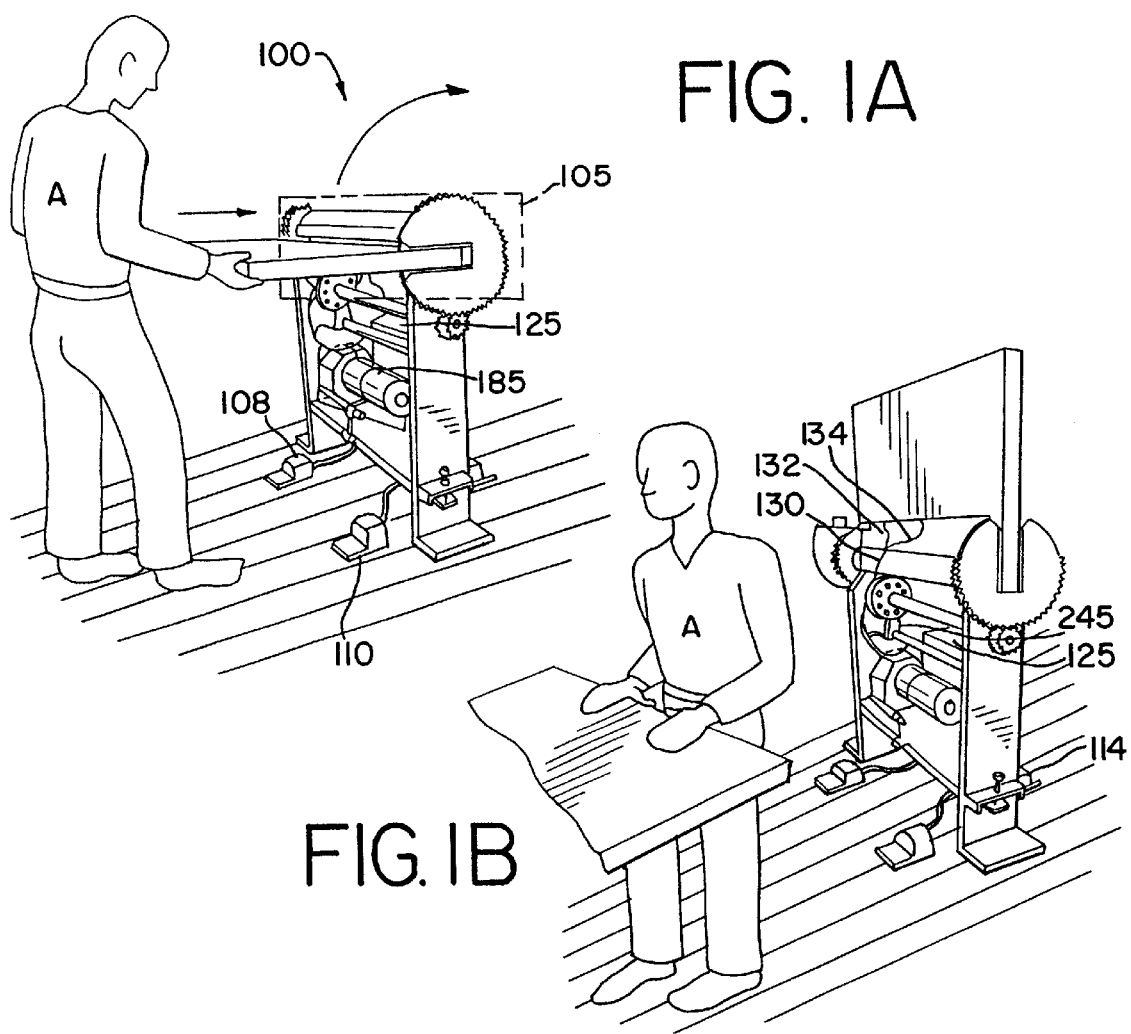
FIG. 1A
FIG. 1B
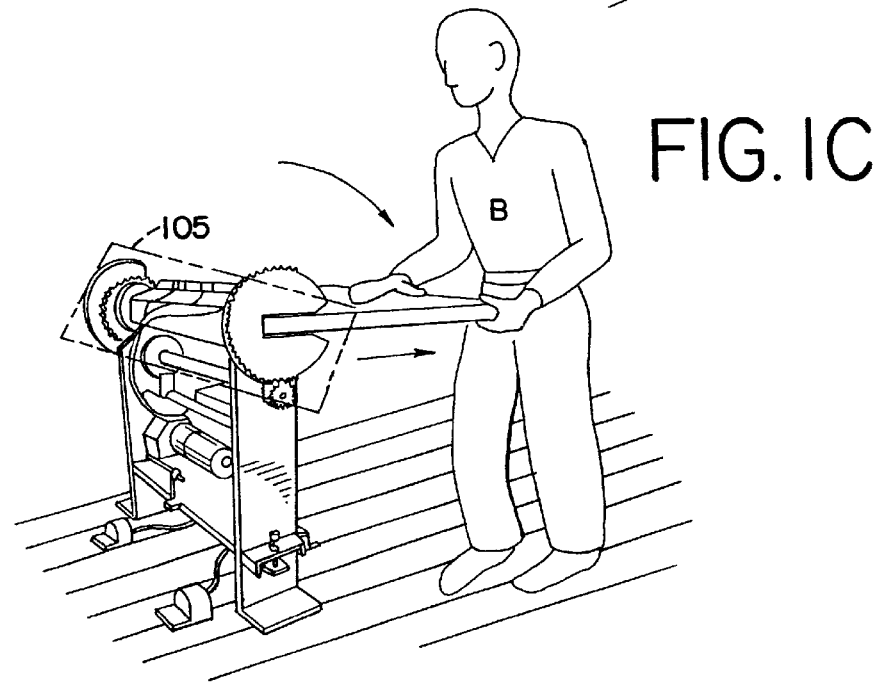
FIG. 1C

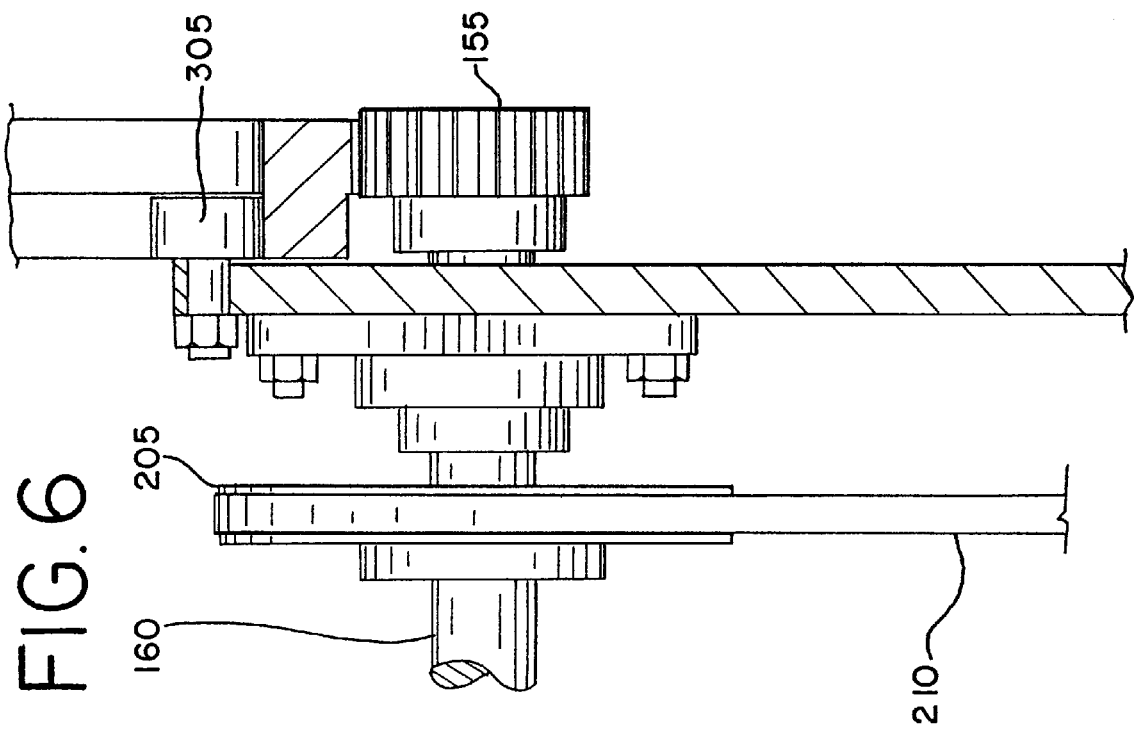
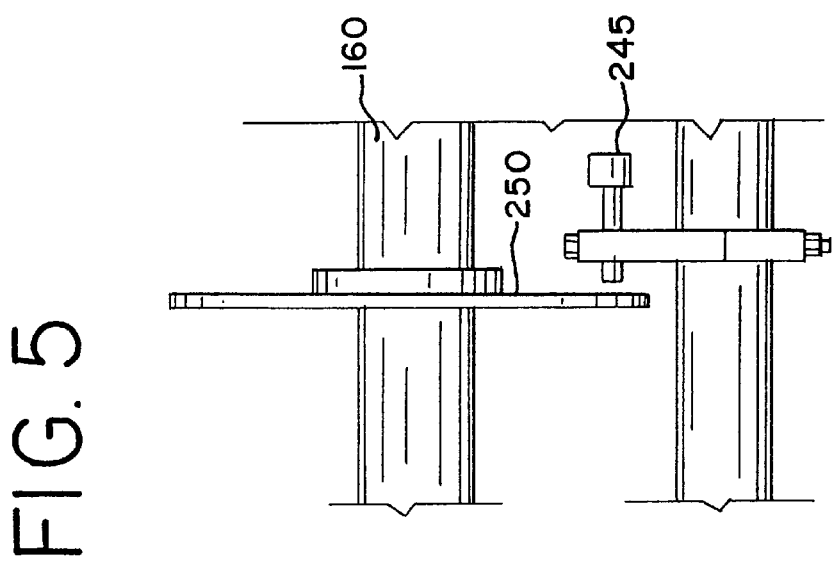

MATERIAL HANDLING DEVICE

RELATED APPLICATION

This application claims the benefit of the filing date pursuant to 35 U.S.C. §119(e) of Provisional Application Serial No. 60/087,851, filed Jun. 3, 1998, the disclosure of which is hereby incorporated by reference.

BACKGROUND OF THE INVENTION

The present invention relates to the field of material handling devices and in particular to a system, apparatus, and method for transferring and inverting generally planar panels.

The assembly and manufacture of planar panels often require systems to convey panels between assembly stations while facilitating access to the panel's front and rear surfaces. In high volume assembly lines, the movement of panels from one area to another further requires areas to store in process inventory separate but accessible to the assembly stations.

A variety of conventional material handling devices use active retaining structures or enclosed cradles. These active structures or cradles often limit assembly line capacity as these devices are capable of receiving articles of limited dimensions. Conventional manufacturing environments frequently require flexibility. Accordingly, planar panel assembly lines must generally accommodate panels of varying dimensions.

Some planar panel material handling devices transfer and invert panels using multiple frame members to retain and invert panels. In these devices, large assembly areas are often required to execute functions and generally these functions require additional power to manipulate frame members.

SUMMARY OF THE INVENTION

The present invention is a material handling system, apparatus, and method for transferring and inverting a generally planar panel. The system, apparatus, and method include a panel-engaging member and a panel-engaging member rotator. The panel-engaging member has a generally rectangular slot to receive only a portion of a panel. The panel-engaging member rotator is adapted to rotate the panel-engaging member about an axis generally parallel to the width of the slot between a position where the slot is generally horizontal and facing one direction to another position where the slot is generally horizontal and facing a generally opposite direction. The height, depth, and width of the slot are selected so that when a portion of the panel is inserted into the slot, the portion of the panel is kept from falling out of the slot by gravity and friction when the holding member is moved.

In another aspect of the invention, the material handling system, apparatus, and method are comprised of a panel-engaging member and a rotating assembly. The panel engaging member is adapted to receive less than two thirds of a panel as the panel is subjected to a rotation from a position where the panel-engaging member is in proximate alignment with the direction of engagement of the panel to a position where the panel-engaging member is in proximate alignment with the direction of disengagement of the panel. The rotating assembly imparts an angular rotation about the assembly's longitudinal axis onto the panel-engaging member.

It should be understood that the system's longitudinal axis, as used herein, refers to the system's axis of rotation which may also be the panel-engaging member's line of symmetry. A generally horizontal position as used herein, refers to an alignment that is within thirty degrees of a level surface. A generally opposite direction as used herein, refers to a position that is more than one-hundred and twenty degrees from another position.

BRIEF DESCRIPTION OF THE DRAWINGS

FIGS. 1A–1C are perspective views of the material handling system;

FIG. 5 is a sectional view of the indexing ring and indexing sensor of the embodiment shown in FIGS. 1A–1C;

FIG. 6 is a sectional view of the stabilizing rollers and propelling member of the embodiment shown in FIGS. 1A–1C;

DETAILED DESCRIPTION OF THE PRESENTLY PREFERRED EMBODIMENTS

Figure 2:
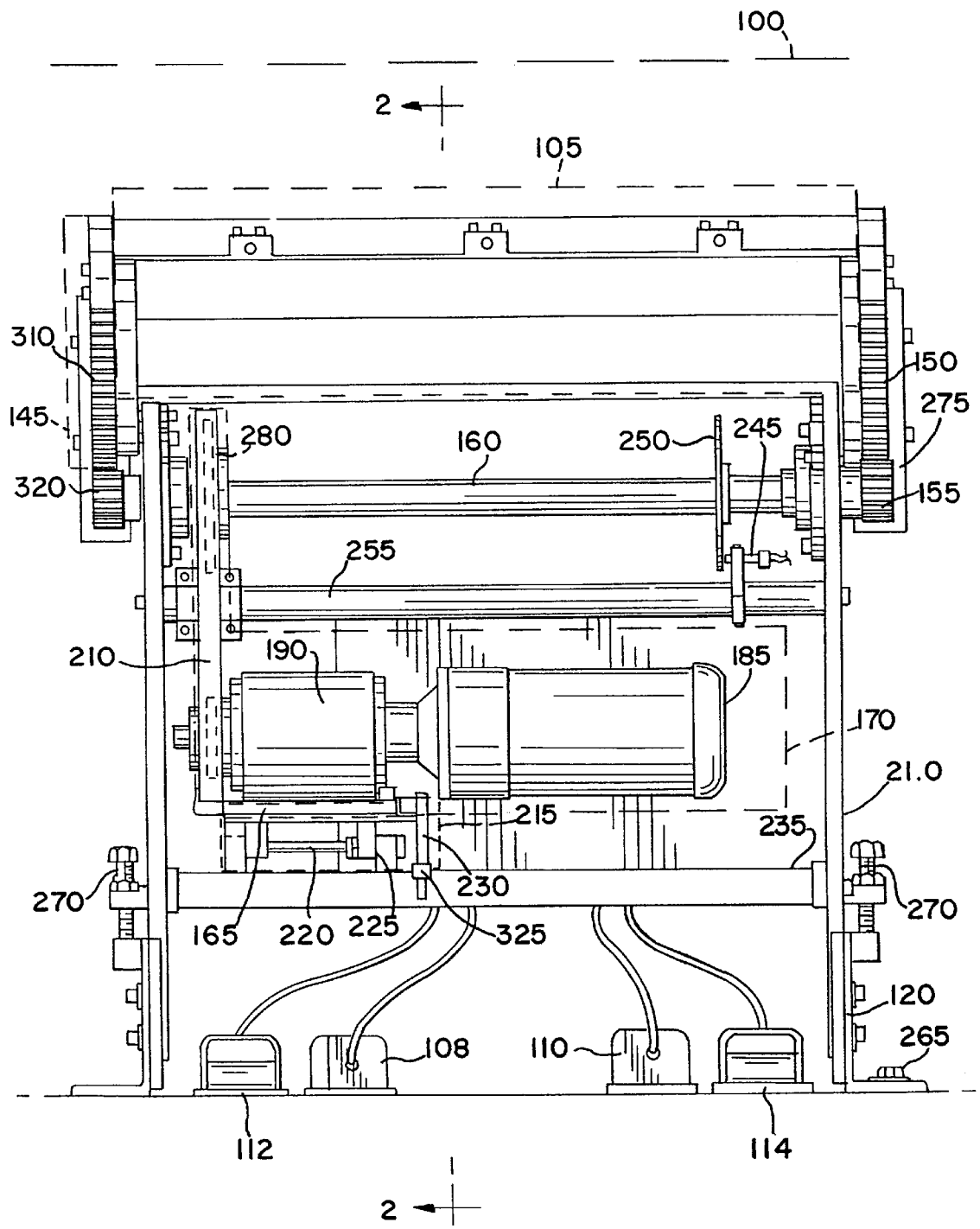
FIG. 2 is a front elevated view of the embodiment shown in FIGS. 1A–1C.

In the drawings, depicted elements are not necessarily drawn to scale and the same reference numbers through several views may designate alike and similar elements.

Figure 3:
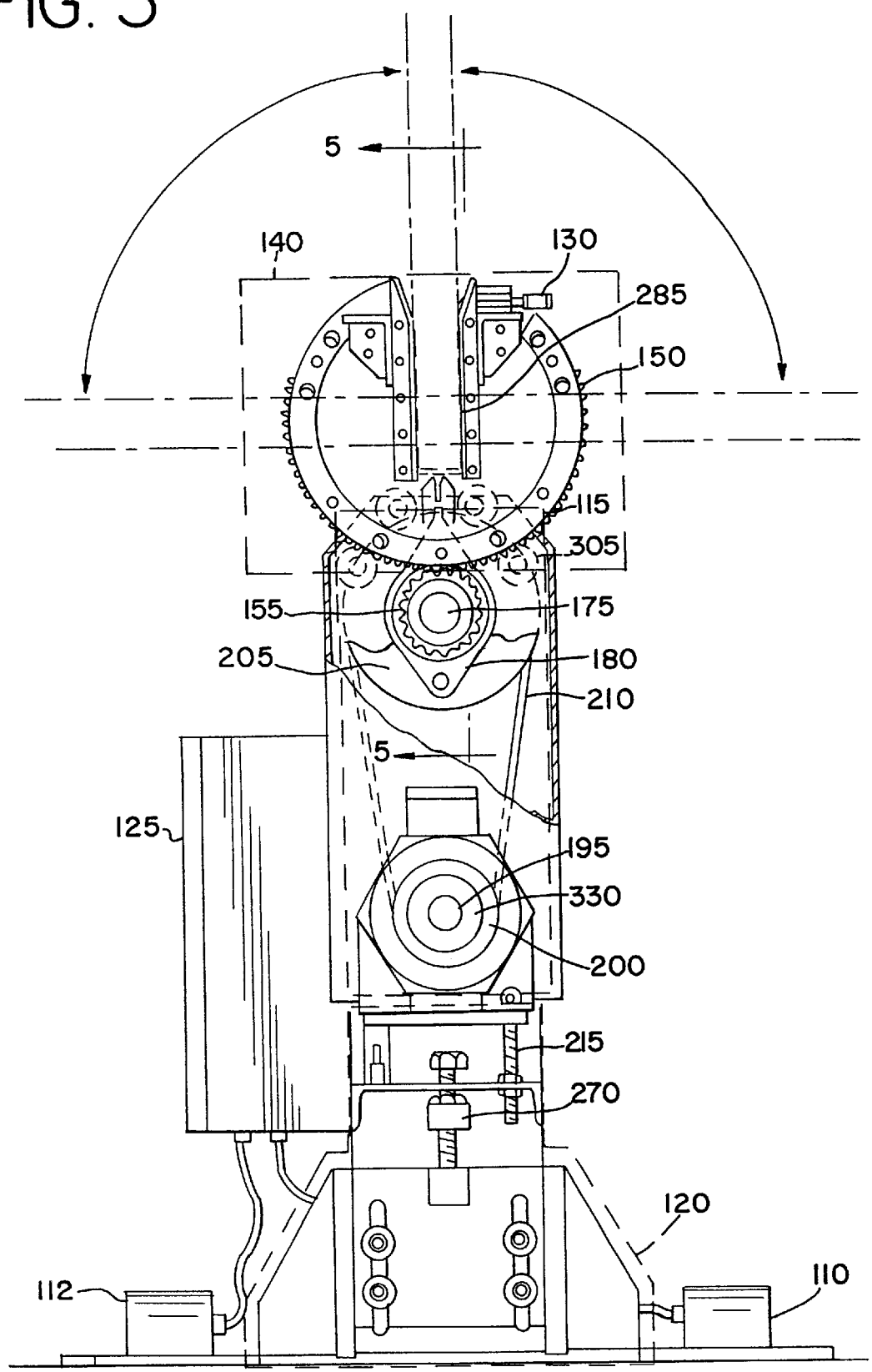
FIG. 3 is a side elevated view of the embodiment shown in FIGS. 1A–1C.

Referring to FIGS. 2 and 3, a material handling system 100 is illustrated. The system 100 has a panel-engaging member 105, a rotating assembly 115, a base assembly 120, a controller 125, and a plurality of starting devices 108, 110, 112, and 114. The panel-engaging member 105 preferably represents a means for engaging a substantially planar panel and includes panel-engaging members of varying sizes and shapes that retain portions of planar panels by gravity and friction. The rotating assembly 115 preferably represents a means for imparting an angular rotation on the panel-engaging member 105 which includes, but is not limited to, direct drive motors and motors coupled to wheels or rollers.

The panel-engaging member 105 preferably includes a plurality of semi-cylindrical disks 140 and 145 and a substantially rectangular body having a generally rectangular slot or recess disposed therein. The slot, defined by three interconnected frame members form an approximately rectangular channel having lateral and frontal apertures. The channel is of sufficient height, depth, and width to secure a substantially planar panel during movement of the panel-engaging member 105.

Figure 4:
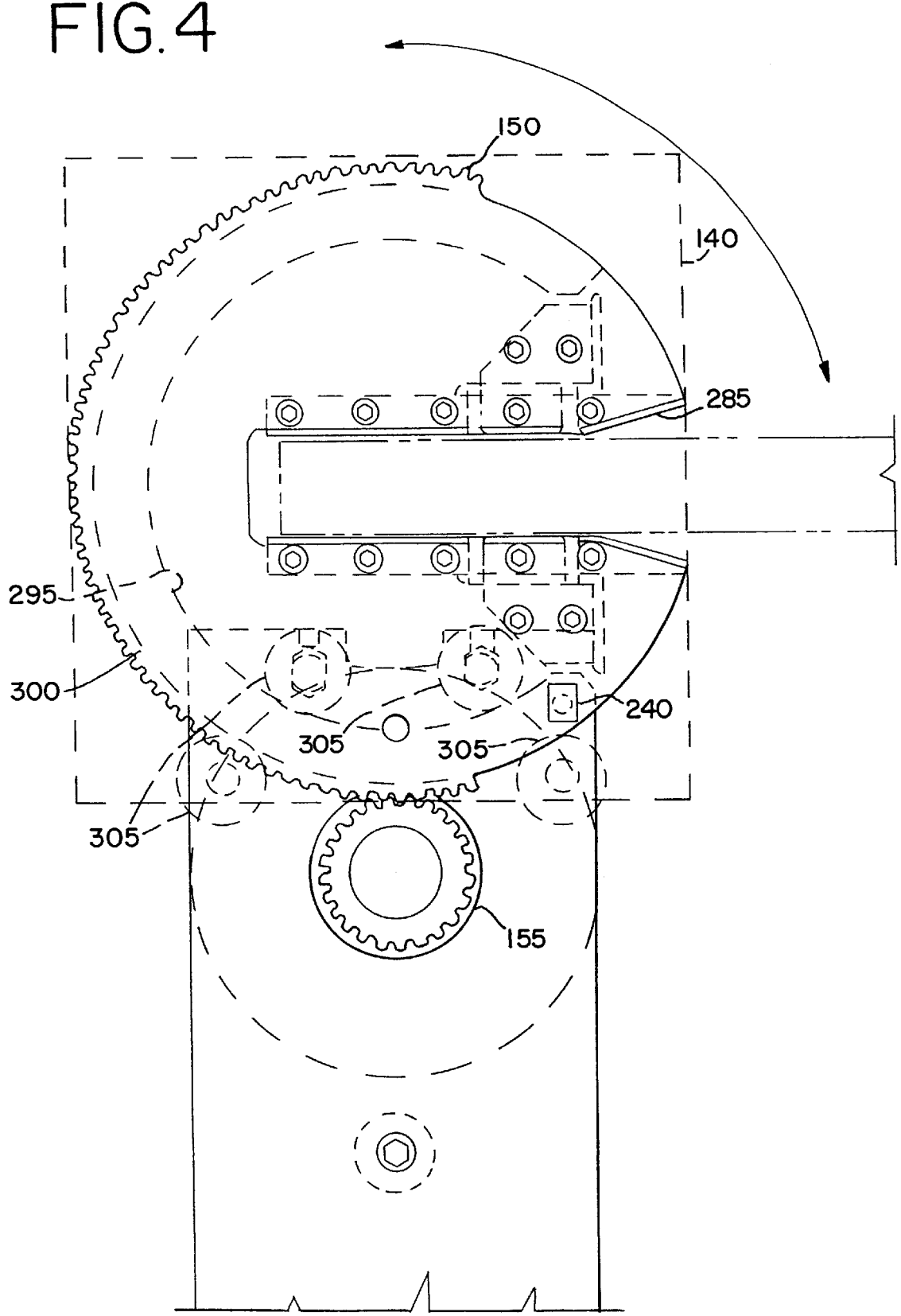
FIG. 4 is sectional view of the embodiment shown in FIGS. 1A–1C.
Figure 8:
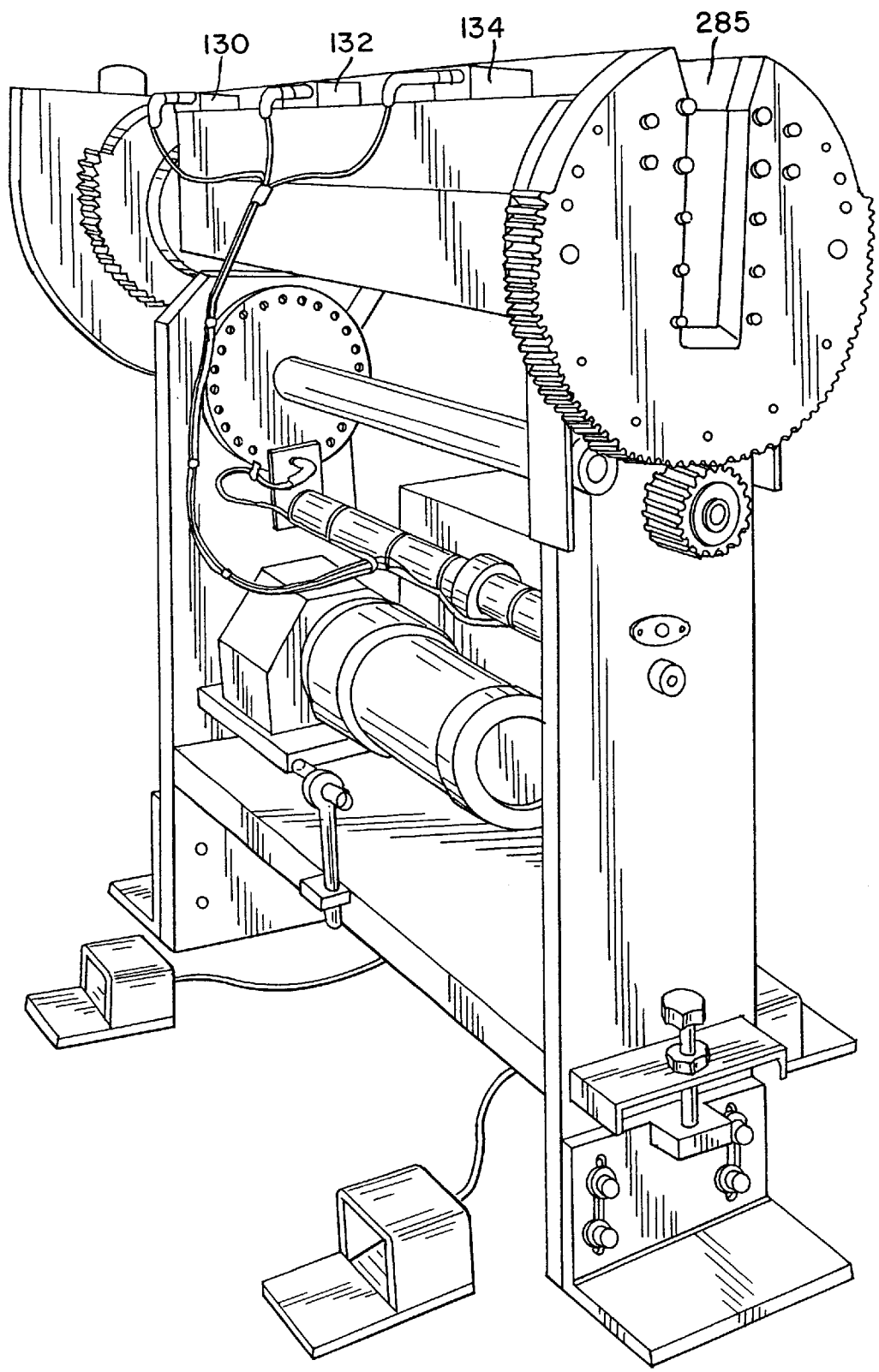
FIG. 8 is a perspective view of the embodiment shown in FIGS. 1A–1C.

As illustrated in FIGS. 4 and 8, an engaging surface 285 outlines the periphery of the channel providing a friction surface engagement for the panel. A plurality of positioning sensors 130, 132, and 134 are secured to the engaging surface 285 at the base and end face of the generally rectangular slot.

Figure 7:
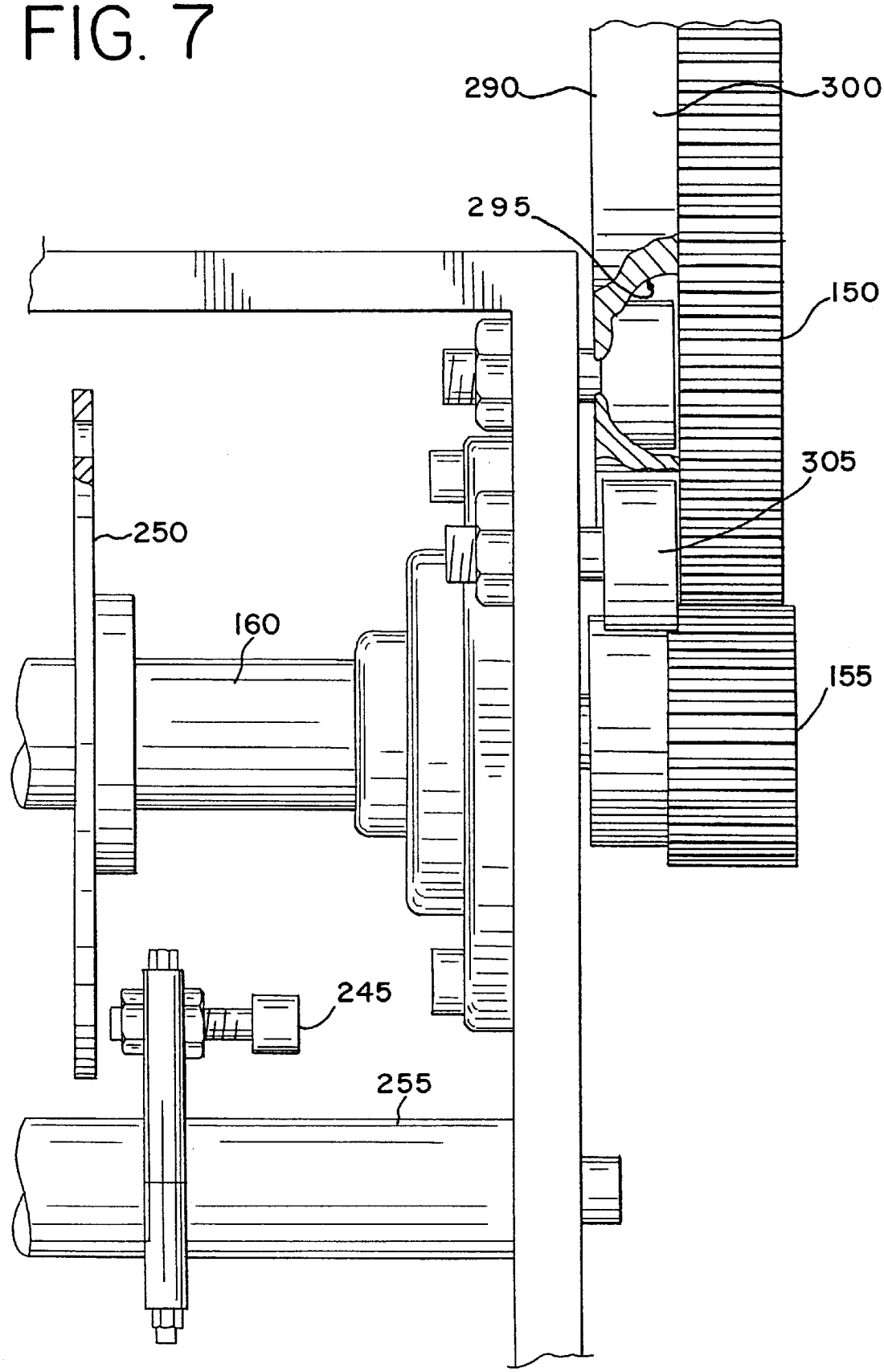
FIG. 7 is an exploded sectional view of the stabilizing rollers and indexing gear of the embodiment shown in FIGS. 1A–1C.

FIGS. 2, 4, and 7 illustrate further details of the panel-engaging member 105. A semi-cylindrical disk 140 is rigidly attached to one end of the generally rectangular slot. The semi-cylindrical disk 140 preferably includes a large driving gear 150 and a circular engaging ring 290. The large driving gear 150 preferably has a plurality of coupling teeth positioned near its perimeter. As shown, the coupling teeth engage a plurality of mating teeth securely attached to gears that make up the rotating assembly 115. The circular engaging ring 290, located on the interior surface of the semicylindrical disk 140, preferably has smoothly rounded interior and exterior surfaces that function as engaging guides 295 and 300. The engaging guides 295 and 300 slidably receive a pair of stabilizing rollers 305 to facilitate smooth steady motion.

Because the panel-engaging member employs symmetrical semi-cylindrical disks 140 and 145, large driving gears 150 and 310, circular engaging rings 290 and 315, and stabilizing rollers 305 at both ends of the generally rectangular slot, the preceding descriptions describe either end of the panel-engaging member 105.

FIGS. 2 and 3 illustrate the rotating assembly 115. The rotating assembly preferably includes a plurality of small driving gears 155 and 320, a spreader shaft 160, and a propelling member 170. A plurality of mating teeth link the small driving gears 155 and 320 to the coupling teeth of the large driving gears 150 and 310. The small driving gears 155 and 320 are joined to the spreader shaft 160 by a bearing boss 175. The bearing boss 175 is rigidly attached to the system 100 by a mounting bracket assembly 180.

As shown in FIGS. 2 and 3, the propelling member 170 includes a driving device 185, a gearbox 190, a drive shaft 195, a first and a second sprocket 200 and 205, and a linking chain 210. The gearbox 190 adjustably links the driving device 185 to the drive shaft 195. The first sprocket 200 is rigidly attached to the drive shaft 195 by a cap 330, such that the rotation of the drive shaft 195 causes the first sprocket 200 to rotate. The linking chain 210 transmits the first sprocket's 200 rotation to the second sprocket 205 which is solidly attached to the spreader shaft 160. A rocking pin 220, a hinged rocking assembly 225, and a tensioning rod 230 are included in a tensioning member 215. The tensioning rod 230 receives a gearbox-mounting rod 165 at one end and is threaded to receive a fastening nut 325 at its other end. When the gearbox-mounting rod 165 is slidably received by the tensioning rod 230 a tightening of the fastening nut 325 sets a tension in the linking chain 210. As further illustrated in FIG. 2, the rocking pin 220 and hinged rocking assembly 225 are preferably orientated to provide further support to the gearbox 190 and driving device 185 by pivotally connecting the gearbox 190 to the base assembly-stabilizing rod 235.

Figure 9:
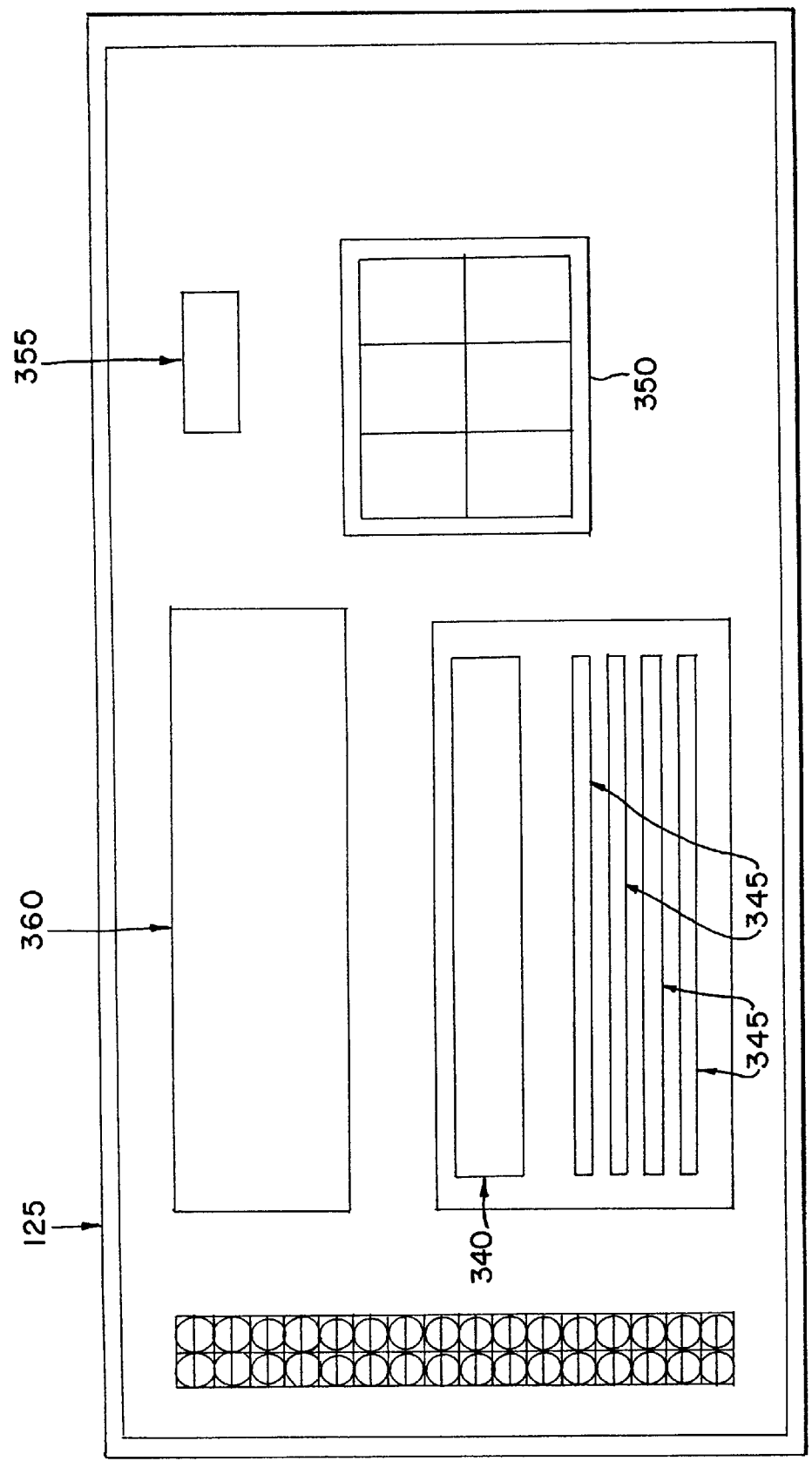
FIG. 9 is a block diagram of the logic circuitry of the embodiment shown in FIGS. 1A–1C.

FIG. 9 illustrates the logic circuitry that monitors and controls the system 100. In the foregoing embodiments an Allen Bradley Micro Logix 1000 interfaced to a Toshiba VF-S7 or adjustable frequency inverter 360 was utilized. As illustrated, a controller 125 is a programmed microprocessor 340 interfaced to a memory array 345, and a display 350, and also may be any combination of pneumatic, analog, and/or logic circuitry. The controller 125 includes a communication interface 355, such as an RS-232 communication interface, that permits communication with other external devices and contains appropriate electrical isolation well known in the art. The logic circuitry further includes a home sensor 240, a home contact 335 (not shown), an indexing sensor 245, an indexing ring 250, a plurality of starting devices 108, 110, 112, and 114 and a plurality of positioning sensors 130, 132, and 134. As illustrated, the indexing ring 250 is preferably a semi-solid annular disk rigidly secured to the spreader shaft 160. The indexing ring 250 has a plurality of apertures near its perimeter. The plurality of apertures are monitored by an indexing sensor 245 solidly secured to a stabilizing bar 255. The home contact 335, which is preferably a protruding solid surface, is optically monitored by the home sensor 240 to sense an initiating or a home position. A plurality of starting devices 108, 110, 112, 114 initiate system 100 rotation. To monitor angular rotation, the indexing sensor 245 monitors the indexing disk 250. The positioning sensors 130, 132, and 134 monitor the panel-engaging member's 105 engagement with the planar panel.

A plurality of floor anchors 265, vertical alignment bolts 270, and safety shields 275 and 280 form a system subassembly. As illustrated in FIG. 2, the floor anchors 265 secure the base assembly 125 to a continuous surface. Vertical alignment bolts 270 provide a system for leveling the panel-engaging member 105 and stabilizing bar 255 by movably joining the frame side plate 260 to the base assembly 120. The plurality of gear guards 275 and a linking guard 280 shield users from injury. The gear guards are mounted across the driving gears 150, 155, 310, and 320 just as the linking guard is mounted across the linking chain 210.

FIGS. 1A–1C illustrate the system's 100 use. The generally rectangular slot disposed in the panel-engaging member 105 is shown in a generally horizontal position. In this position, the home contact 335 (not shown) and home sensor 240 (not shown) are in optical alignment causing the home sensor 240 to generate a logic enabling signal that is sensed by the controller 125. As illustrated in FIG. 1A, a substantially planar panel is partially inserted into the generally rectangular slot of the panel-engaging member 105. When the panel is inserted into the generally rectangular slot, the positioning sensors 130, 132, and 134 preferably generate a logic-engaging signal that is sensed by the controller 125. Activation of the system 100 occurs when the user engages two starting devices 108 and 110 concurrently. When starting devices 108 and 110 are engaged, the controller 125 directs the driving device 185 to rotate the panel-engaging member 105 from a substantially horizontal position to a substantially vertical position as shown in FIGS. 1A and 1B. When the controller 125 senses the activation signal, the controller 125 preferably samples data identifying the location of the engaging member 105 generated by the indexing sensor 245. When the starting devices 112 (not shown) and 114 are concurrently engaged, the controller 125 directs the driving device 185 to rotate the panel-engaging member 105 from its substantially vertical position to a position that is generally opposite its initial receiving position while the starting devices 112 and 114 are engaged. When the panel is removed from the panel-engaging member 105, the positioning sensors 130, 132, and 134 preferably generate a logic-disengaging signal that is sensed by the controller 125. Removal of the panel preferably causes the controller 125 to direct the driving device 185 to reverse its rotational direction after a short delay and return the panel-engaging member 105 to its initial receiving position in which the home contact 335 (not shown) and home sensor 240 (not shown) are again in optical alignment.

Alternatively, the system 100 may be adapted so that the panel-engaging member 105 is rotated from a position where the generally rectangular slot is generally horizontal and facing one direction to a position where the generally rectangular slot is generally horizontal and facing a generally opposite direction without stopping. The system may be further adapted so that the panel-engaging member 105 stops in an infinite number of positions essentially ranging between zero and one-hundred and eighty degrees from the slot's generally horizontal position.

Individuals skilled in the art will appreciate the wide array of structures that may be practiced in other embodiments. For instance, the engaging surface 285 may comprise adhesive, metallic, elastic, or fabric surfaces. The teeth that encircle the large and small driving gears 150, 155, 310 and 320 may be replaced by a roller and guide structure or a friction-less field engagement assembly, for example. Likewise, the linking chain 210 may embody a belt or a cable or may not be practiced in an embodiment that employs a direct drive engagement. The driving device 185 may be a variable or continuous speed electric, pneumatic, or hydraulic motor. It is further envisioned that the system 100 may not have a driving device 185 but is manually propelled or designed as a parasitic load.

Variations and modifications of the embodiments disclosed in this specification may be made without departing from scope and spirit of the invention. The aforementioned description is intended to be illustrative rather than limiting and it is understood that the scope of the invention is set forth by the following claims.

We claim:

1. A material handling device for transferring and inverting a generally planar panel, comprising:
   a frame;
   a panel-engaging member rotatably mounted on said frame having a generally rectangular slot correspondingly sized and shaped to provide opposed panel engaging surfaces to receive and hold only a portion of a panel;
   a panel-engaging member rotator configured with a first stop associated with a first position wherein the slot is generally horizontal and facing one direction, and configured with a second stop associated with a second position wherein the slot is generally horizontal and facing a generally opposite direction;
   a rotating assembly configured to rotate said rotator between said first and said second positions; and
   wherein a size of a height, a depth, and a width of the slot are fixed so that when a portion of the panel is inserted therein, the portion is kept from falling out of the slot by gravity and friction when the panel-engaging member is moved between the first and second positions.

2. The device of claim 1, wherein the depth of the slot is such that the slot receives less than one-half of the panel.

3. The device of claim 1, wherein the rotator is configured with a third stop associated with a third position between the first and second positions.

4. The device of claim 1, wherein the surfaces of the slot are equipped with an engaging surface.

5. The device of claim 1, further comprising a controller for the rotator whereby the movement between the first and second position is begun and completed in response to a signal generated by a user.

6. A material handling system for inverting a substantially planar panel, comprising:
   a frame;
   a panel-engaging member rotatably mounted on said frame and having a slot configured with fixed opposed panel engaging surfaces to receive and hold less than two thirds of a panel in said slot during rotation as the panel is subjected to a rotation from a first horizontal position wherein the panel-engaging member is in proximate alignment with the direction of engagement of the panel to a second horizontal position wherein the panel-engaging member is in proximate alignment with the direction of disengagement of the panel; and
   a rotating assembly that imparts an angular rotation about a longitudinal axis of the assembly and onto the panel-engaging member, said rotating assembly comprising a first stop associated with said first horizontal position and a second stop associated with said second horizontal position.

7. The material handling system of claim 6, wherein the panel-engaging member has a generally rectangular slot to receive the panel.

8. The material handling system of claim 6, wherein the panel-engaging member stops in a substantially vertical position between the first and second positions.

9. The material handling system of claim 6, wherein the rotating assembly is configured to impart no more than a one-hundred and eighty degree rotation about the longitudinal axis of the assembly.

10. The material handling system of claim 6, wherein the rotating assembly is responsive to a controller.

11. The material-handling system of claim 10, wherein the controller is responsive to automatic and user control.

12. The material handling system of claim 10, further comprising a plurality of sensing elements that automatically communicate the angular rotation of the rotating assembly to the controller.

13. The material handling system of claim 10, further comprising a plurality of sensing elements that automatically communicate the panel position in the panel-engaging member to the controller.

14. The material handling system of claim 10, further comprising at least one starting device for initiating the rotation of the panel-engaging member from the first position to the second position.

15. The material handling system of claim 14, wherein the panel-engaging member automatically returns to the first position when the panel is removed from the panel-engaging member.

16. A material handling apparatus for inverting a panel, comprising:
   a frame:
   a panel-engaging member rotatably mounted on said frame and having a slot configured with fixed opposed panel engaging surfaces to engage and hold less than one-half of the length of a panel during rotation as the panel is subjected to an angular rotation;
   a first stop associated with said panel being in a first horizontal position and a second stop associated with said panel being in a second horizontal position; and
   a rotating assembly that imparts no more than a one-hundred and eighty degree rotation between said first and second stops about a longitudinal axis of the assembly and onto the panel-engaging member.

17. The material handling apparatus of claim 16, wherein the panel-engaging member has a substantially rectangular slot to receive the panel.

18. The material handling apparatus of claim 16, further comprising a controlling assembly.

19. The material handling apparatus of claim 18, further comprising at least one sensing element that automatically communicates the position of the panel in the panel-engaging member to the controller.

20. The material handling apparatus of claim 18, further comprising at least one sensing element that automatically communicates the angular rotation of the rotating assembly to the controller.

21. The material handling apparatus of claim 18, further comprising at least one starting device for initiating the rotation of the panel-engaging member.

22. A material handling system for transferring and inverting a generally planar panel, comprising:

a frame;

means for engaging less than one-half of the length of a panel thereby retaining the panel as the panel is subjected to an angular rotation, said engaging means being defined by a panel-engaging member rotatably mounted on said frame and having a slot configured with fixed opposed panel engaging surfaces for engaging and holding less than one-half of the length of a panel for transferring and inverting the panel;

means for imparting no more than a one-hundred and eighty-degree rotation about a longitudinal axis of the assembly onto the panel-engaging member; and means for stopping said imparting means at a first position associated with the panel being in a first horizontal position and means for stopping said imparting means at a second position associated with the panel being in a second horizontal position.

* * * * *

UNITED STATES PATENT AND TRADEMARK OFFICE
CERTIFICATE OF CORRECTION

PATENT NO. : 6,299,405 B1
DATED : October 9, 2001
INVENTOR(S) : Tim R. Sterken et al.

It is certified that error appears in the above-identified patent and that said Letters Patent is hereby corrected as shown below:

Column 6,
Line 19, delete "material-handling" and substitute -- material handling -- in its place.
Line 43, delete "panel engaging" and substitute -- panel-engaging -- in its place.

Column 7,
Line 9, delete "panel engaging" and substitute -- panel-engaging -- in its place.

Signed and Sealed this

Seventh Day of January, 2003

JAMES E. ROGAN
*Director of the United States Patent and Trademark Office*